(12) United States Patent
Sasaki et al.

(10) Patent No.: US 9,285,032 B2
(45) Date of Patent: Mar. 15, 2016

(54) PISTON RING

(71) Applicant: KABUSHIKI KAISHA RIKEN, Chiyoda-ku, Tokyo (JP)

(72) Inventors: Hayato Sasaki, Kumagaya (JP); Takashi Ono, Kumagaya (JP); Toshikatsu Hayashi, Kumagaya (JP); Kouhei Sugimoto, Kumagaya (JP)

(73) Assignee: KABUSHIKI KAISHA RIKEN, Tokyo (JP)

( * ) Notice: Subject to any disclaimer, the term of this patent is extended or adjusted under 35 U.S.C. 154(b) by 0 days.

(21) Appl. No.: 14/432,238

(22) PCT Filed: Oct. 2, 2013

(86) PCT No.: PCT/JP2013/005892
§ 371 (c)(1),
(2) Date: Mar. 30, 2015

(87) PCT Pub. No.: WO2014/054286
PCT Pub. Date: Apr. 10, 2014

(65) Prior Publication Data
US 2015/0226327 A1  Aug. 13, 2015

(30) Foreign Application Priority Data

Oct. 2, 2012  (JP) .................................. 2012-220836

(51) Int. Cl.
*F02F 5/00* (2006.01)
*F16J 9/28* (2006.01)
*F16J 9/22* (2006.01)
(Continued)

(52) U.S. Cl.
CPC ... *F16J 9/28* (2013.01); *F02F 5/00* (2013.01); *F16J 9/12* (2013.01); *F16J 9/22* (2013.01); *F16J 9/26* (2013.01)

(58) Field of Classification Search
CPC .................. F16J 9/00; F16J 9/26; F16J 9/28; F02F 5/00
See application file for complete search history.

(56) References Cited

U.S. PATENT DOCUMENTS

2009/0051123 A1* 2/2009 Kariya et al. .................. 277/442
2012/0242047 A1* 9/2012 Sasaki et al. .................. 277/443

FOREIGN PATENT DOCUMENTS

CN       101429904 A    5/2009
JP       S62233458 A    10/1987
(Continued)

OTHER PUBLICATIONS

Nov. 12, 2013 International Search Report issued in International Patent Application No. PCT/JP2013/005892.
(Continued)

*Primary Examiner* — Gilbert Lee
(74) *Attorney, Agent, or Firm* — Kenja IP Law PC

(57) ABSTRACT

Disclosed is a piston ring that, in an engine where high temperature is reached in the vicinity of the piston ring, is capable of sustaining an excellent effect of preventing aluminum cohesion over a prolonged period of time. The piston ring having a resin-based coating formed on at least one of an upper surface and a lower surface of a piston ring body, the resin-based coating including a first resin-based coating containing plate-like filler having a mean particle diameter of 2 μm to 20 μm and an aspect ratio of 20 to 200 and a second resin-based coating located under the first resin-based coating and containing hard particles having a mean particle diameter of 0.01 μm to 1 μm.

8 Claims, 4 Drawing Sheets

(51) Int. Cl.
*F16J 9/26* (2006.01)
*F16J 9/12* (2006.01)

(56) References Cited

FOREIGN PATENT DOCUMENTS

| JP | S63170546 | A | 7/1988 |
| JP | H07166393 | A | 6/1995 |
| JP | H07-65683 | B2 | 7/1995 |
| JP | 2003286895 | A | 10/2003 |
| JP | 2008128482 | A | 6/2008 |
| JP | 4151379 | B | 9/2008 |
| JP | 2009052625 | A | 3/2009 |
| JP | 2009074539 | A | 4/2009 |
| WO | 2007099968 | A1 | 9/2007 |

OTHER PUBLICATIONS

Oct. 10, 2015, Office Action issued by the SIPO in the corresponding Chinese Patent Application No. 201380051347.2.

* cited by examiner

PISTON RING

TECHNICAL FIELD

This disclosure relates to a piston ring, and more specifically, to a piston ring for an internal combustion engine.

BACKGROUND

Among piston rings used in an internal combustion engine, a top ring closest to a combustion chamber vigorously collides, due to combustion pressure, with a piston ring groove (a ring groove) of a piston made of aluminum alloy or the like and, simultaneously, slides on a surface of the ring groove. Combustion of fuel causes high temperature inside the internal combustion engine, and it is known that, in the vicinity of the top ring of a gasoline engine, the temperature rises to 200° C. or higher, causing a decrease in strength of the piston due to a thermal shock and the like.

On the surface of the piston ring groove, as illustrated in FIG. 1, projections of approximately 1 µm in height are formed at 0.2 mm intervals by a turning process of a tool. These projections are lost or worn away due to the colliding and sliding of the piston ring, exposing a new aluminum surface of the ring groove. The new aluminum surface easily adheres to the surface of the piston ring made of metal, which phenomenon will be referred to as "aluminum cohesion" hereinafter. The aluminum cohesion promotes abrasion of the ring groove. When the abrasion of the ring groove advances, sealing property of the piston ring becomes deteriorated, increasing blowby in which a combustion gas flows into a crank chamber from the combustion chamber. An increase in a blowby gas may possibly cause troubles including a reduction in power of the engine.

In order to prevent the aluminum cohesion, there have been suggested a method of avoiding direct contact between the ring groove and the piston ring and a method of buffering a damaging force applied to the ring groove by the piston ring.

As a countermeasure taken for the piston, as disclosed in PLT 1 set forth below, there has been suggested a method of carrying out anodic oxidation treatment (anodizing treatment) on the ring groove and, further, filling a lubricant material in micropores generated by the anodic oxidation treatment of the ring groove. Since a hard oxide coating is formed on the surface of the ring groove by the anodic oxidation treatment, loss of aluminum is prevented and the aluminum cohesion becomes less likely to occur. However, there are issues that the anodic oxidation treatment of the piston is costly and, due to the hardness of the oxide coating, initial compatibility is low.

As a countermeasure taken for the piston ring, as disclosed in PLT 2 set forth below, there has been suggested a method of forming, on an upper surface and a lower surface of the piston ring, a coating made of polyamide and the like, which is a heat resistant resin, containing molybdenum disulfide or the like serving as a solid lubricant dispersed therein, thereby alleviating the damaging force applied to the ring groove.

PLT 3 set forth below suggests a method of forming a coating layer containing polyamide imide as a main component, a polyamide imide coating layer modifier, and a dry coating lubricant containing hard particles such as alumina and the like on a sliding surface of a sliding member having abrasion of predetermined surface roughness, thereby improving abrasion resistance and tight-contact of the sliding member while reducing a friction coefficient.

PLT 4 set forth below suggests a method of laminating, on the upper surface and the lower surface of the piston ring, an outermost surface layer made of the heat resistant resin containing metal powder and a base layer made of the heat resistant resin, thereby improving the abrasion resistance and the tight-contact.

Recently, an increase in power of the engines have been promoted from the viewpoint of a measure for addressing environmental issues, leading to a further increase in the temperature in the vicinity of the top ring. Such circumstances have been making it difficult to maintain the resin coating on the piston ring over a prolonged period of time and sustain an effect of preventing the aluminum cohesion.

PLT 5 set forth below discloses a cylinder liner having a plateau structure obtained by processing a surface of a coating formed on an inner circumferential surface of the cylinder liner on which the piston ring slides, and a method of the processing.

CITATION LIST

Patent Literatures

PTL 1: Japanese Patent Application Laid-Open Publication No. 63-170546
PTL 2: Japanese Patent Application Laid-Open Publication No. 62-233458
PTL 3: Japanese Patent No. 4151379
PTL 4: Japanese Patent Application Laid-Open Publication No. 2009-74539
PTL 5: Japanese Patent Application Laid-Open Publication No. 2003-286895

It could thus be helpful to provide a piston ring that sustains the effect of preventing the aluminum cohesion under high temperature conditions over a prolonged period of time.

SUMMARY

As a result of diligent researches in view of the above problems, we found that forming, on at least one of an upper surface and a lower surface of a piston ring, a resin-based coating comprising a first resin-based coating containing a plate-like filler having a predetermined mean particle diameter and a predetermined aspect ratio, and a second resin-based coating containing hard particles having a predetermined mean particle diameter allows sustenance of an excellent effect of preventing aluminum cohesion in a high power engine over a prolonged period of time, and thus accomplished our piston ring. That is, our piston ring having the resin-based coating formed on at least one of the upper surface and the lower surface of the piston ring, the resin-based coating including the first resin-based coating containing the plate-like filler having the mean particle diameter of 2 µm to 20 µm and the aspect ratio of 20 to 200 and the second resin-based coating located under the first resin-based coating and containing the hard particles having the mean particle diameter of 0.01 µm to 1 µm.

Our piston ring is capable of sustaining an effect of preventing aluminum cohesion under high temperature conditions over a prolonged period of time.

DETAILED DESCRIPTION

Hereinafter, an embodiment of our piston ring will be described with reference to the accompanying drawings FIG. 2 to FIG. 6.

Figure 1:
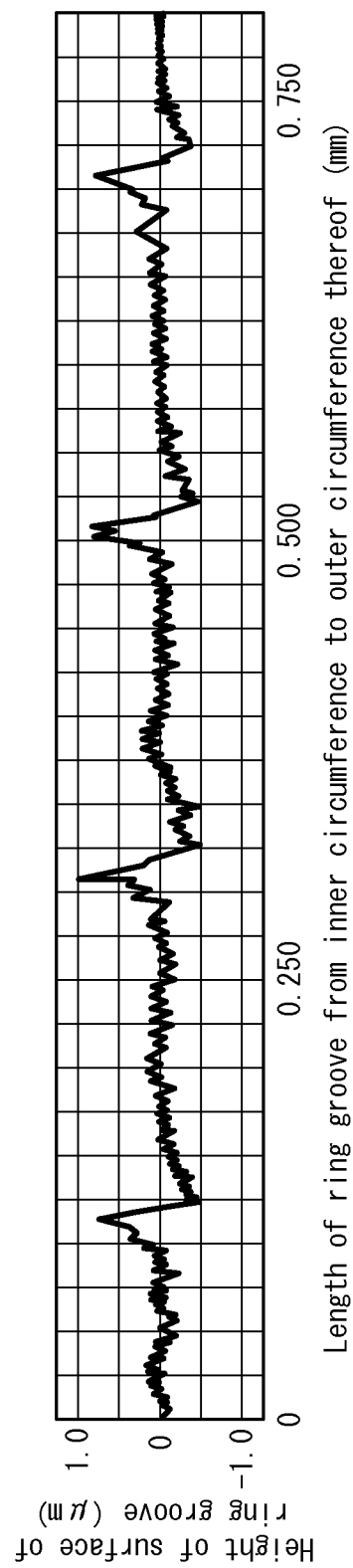
FIG. 1 is a diagram illustrating a measurement of surface roughness of a common ring groove.
Figure 2:
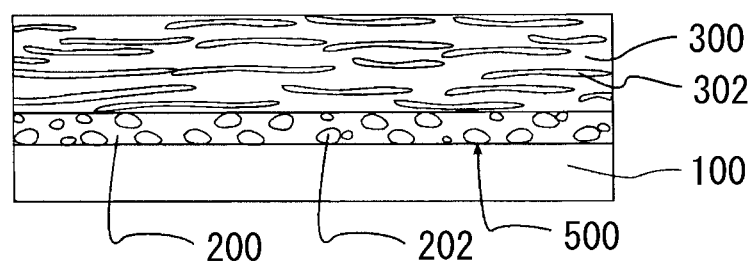
FIG. 2 is a diagram illustrating an example of a cross-sectional shape of our piston ring in the vicinity of an upper surface and a lower surface thereof.

FIG. 2 illustrates an example of our piston ring. Although not illustrated in FIG. 2, a piston ring body 100 may have a phosphate coating formed on an upper surface and a lower surface (hereinafter, also referred to as a "surface 500") thereof. A second resin-based coating 200 containing hard particles 202 is formed on the surface 500 or on the phosphate coating. On the second resin-based coating 200, a first resin-based coating 300 is formed containing a plate-like filler 302 dispersed therein facing a direction substantially parallel to the surface 500.

Figure 3:
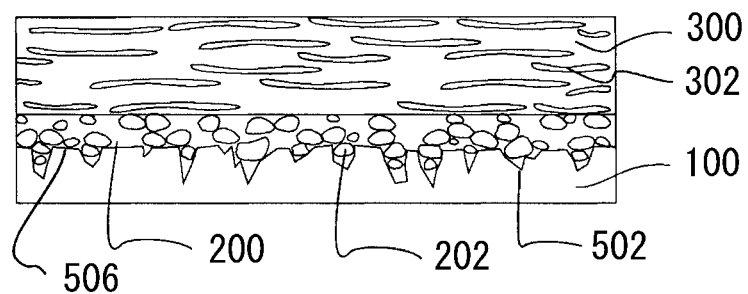
FIG. 3 is a diagram illustrating another example of the cross-sectional shape of our piston ring in the vicinity of the upper surface and the lower surface thereof.
Figure 4:
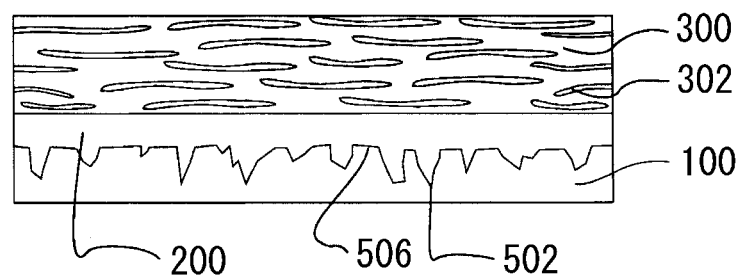
FIG. 4 is a diagram illustrating an example of a cross-sectional shape of a conventional piston ring in the vicinity of an upper surface and a lower surface thereof.

Our piston ring, as illustrated in FIG. 3, may have the surface 500 having a plateau structure. The plateau structure is defined by, for example, Japanese Industrial Standards JISB0671, and means a structure in which a surface includes plateau portions 506 (see FIG. 3 and FIG. 4) and valley portions 502 (see FIG. 3 and FIG. 4). When the surface 500 has the plateau structure, a portion of the second resin-based coating 200 formed on the surface 500 is inserted into the valley portions 502. Thereby, adhesion between the second resin-based coating 200 and the piston ring body 100 is improved due to an anchor effect. According to this disclosure, in particular, some of the hard particles 202 in the second resin-based coating inserted into the valley portions 502 project from the plateau portions 506 as illustrated in FIG. 3 lying across the valley portions 502 of the piston ring body 100 and the second resin-based coating 200. Accordingly, as compared to a piston ring having the second resin-based coating 200 that does not contain the hard particles 202 as illustrated in FIG. 4, our piston ring has better resistance against sheering stress in a lateral direction of the second resin-based coating 200 and the piston ring body 100. Therefore, the second resin-based coating 200 is unlikely to separate from the piston ring body 100.

Figure 5:
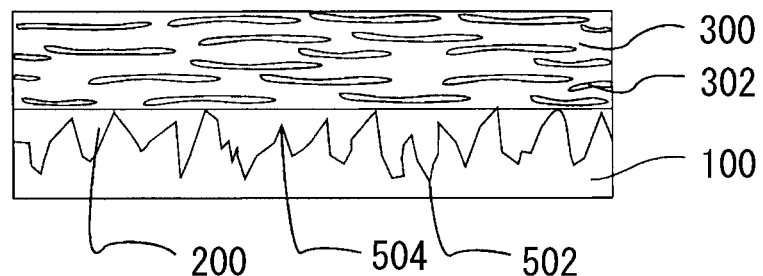
FIG. 5 is a diagram illustrating another example of the cross-sectional shape of the conventional piston ring in the vicinity of the upper surface and the lower surface thereof.

When the surface 500 has, in place of the plateau structure, surface roughness including peak portions 504 as illustrated in FIG. 5 and is exposed as the first resin-based coating 300 and the second resin-based coating 200 are worn away, the peak portions 504 of the piston ring body 100 may damage a surface of a piston ring groove. In order to prevent aluminum cohesion, therefore, the surface 500 preferably has the plateau structure. Note that the second resin-based coating 200 in FIG. 5 does not contain the hard particles 202.

Figure 6:
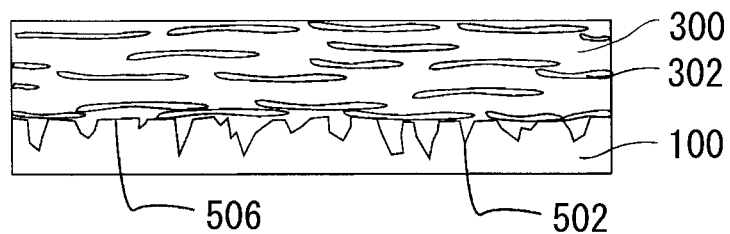
FIG. 6 is a diagram illustrating yet another example of the cross-sectional shape of the conventional piston ring in the vicinity of the upper surface and the lower surface thereof.

As illustrated in FIG. 6, on the other hand, when the surface 500 has the plateau structure and the first resin-based coating 300 containing the plate-like filler 302 is formed thereon without the second resin-based coating 200, some of the plate-like filler 302 directly contact the plateau portions 506 instead of contacting via the resin. In this case, since neither the plate-like filler 302 nor the surface 500 has adhesive property, adhesion of the first resin-based coating 300 is significantly reduced. Therefore, the second resin-based coating 200 containing the hard particles 202 is formed between the surface 500 and the first resin-based coating 300.

[1] Piston Ring Body

The piston ring body 100 is not particularly limited but needs to be strong to some degrees in consideration of its colliding with the ring groove in a repeating manner. Preferable materials include steel, martensitic stainless steel, austenitic stainless steel, high-grade cast iron, and the like. Further, in order to improve the wear resistance, nitriding treatment may be carried out on an outer peripheral surface of the piston ring made of stainless steel, or hard chromium plating or electroless nickel plating may be carried out on the outer peripheral surface of the piston ring made of cast iron. In either case, a hard carbon coating may be formed.

[2] Substrate Treatment of Piston Ring Body

In order to improve adhesion between the piston ring body 100 and the resin-based coating, a phosphate coating having excellent adhesion to the resin may be preliminarily formed on the surface 500. The phosphate coating may be either zinc phosphate, manganese phosphate, or calcium phosphate.

Note that the plateau structure described above is formed at a surface immediately under the second resin-based coating 200. Therefore, when the phosphate coating is formed on the surface 500, a surface of the phosphate coating has the plateau structure. In order to form the plateau structure at a surface of the phosphate coating, after the formation of the phosphate coating, the surface of the phosphate coating is polished. However, when the phosphate coating is too thin having a thickness of 4 μm or less, the surface 500 is subjected to polishing and then the phosphate coating is formed, whereby the plateau structure is spontaneously formed at the surface of the phosphate coating.

[3] Resin-Based Coating

The resin-based coating includes the first resin-based coating 300 and the second resin-based coating 200 those having different properties. The first resin-based coating 300 contains the plate-like filler 302 that are arranged substantially parallel to the upper surface and the lower surface of the piston ring and have a mean particle diameter of 2 μm to 20 μm and an aspect ratio of 20 to 200. The second resin-based coating 200 is positioned closer to the piston ring body 100 (forms a lower layer) than the first resin-based coating 300 and contains the hard particles 202 having a mean particle diameter of 0.01 μm to 1 μm.

Since the first resin-based coating 300 contains the plate-like filler 302 made of a hard material arranged parallel to the upper surface and the lower surface of the piston ring, during initial sliding on the surface of the ring groove, the first resin-based coating 300 may remove projections on the surface of the ring groove in a short time without severely roughening the surface of the ring groove. The piston ring, when the upper surface and the lower surface thereof collide with and slide on the surface of the ring groove due to an up-and-down motion of the piston and combustion pressure, is subjected to strong stress. According to our piston ring, however, since the projections on the surface of the ring groove are removed at an early stage without roughening the surface of the ring groove, a damaging force applied to the resin-based coating by the surface of the ring groove is also reduced at the early stage. Further, since the plate-like filler 302 made of the hard material are dispersed in the first resin-based coating 300, the stress caused by the piston ring colliding with and sliding on the surface of the ring groove is alleviated, whereby the first resin-based coating 300 may be maintained over a prolonged period of time, sustaining an excellent effect of preventing the aluminum cohesion.

When the first resin-based coating 300 is worn away, the second resin-based coating 200 lying under the first resin-based coating 300 is exposed on the surface. However, since the hard particles 202 in the second resin-based coating 200 increases the strength of the second resin-based coating 200, the second resin-based coating 200 may be prevented from being worn away due to the stress caused by the colliding with and sliding on the surface of the ring groove and the like. Accordingly, since the upper surface and the lower surface of the piston ring contact the surface of the ring groove at least via the second resin-based coating 200, the aluminum cohesion may be prevented.

Further, even when our piston ring is used over a prolonged period of time causing attrition of the second resin-based coating 200 and direct contact between the piston ring body 100 and the surface of the ring groove, since in the process of the attrition of the second resin-based coating 200 the hard particles 202, which are fine particles contained in the second resin-based coating 200, makes the surface of the ring groove smoother than that when the first resin-based coating 300 is worn away, the aluminum cohesion may be suppressed.

When the mean particle diameter of the plate-like filler 302 contained in the first resin-based coating 300 exceeds 20 μm, the plate-like filler 302 tend to roughen the surface of the ring groove. On the other hand, when the mean particle diameter of the plate-like filler 302 is smaller than 2 μm, the projections on the surface of the ring groove may not be removed in a short time. Also, when the aspect ratio of the plate-like filler 302 exceeds 200, a stress alleviating effect thereof reduces. On the other hand, when the aspect ratio is smaller than 20, the plate-like filler 302 tend to severely roughen the surface of the ring groove.

Note that the "mean particle diameter of the plate-like filler" as used herein means a mean length of longitudinal sides of the plate-like particles, which may be obtained by observing the surface of the first resin-based coating with a scanning electron microscope (SEM) and calculating a 50% accumulated value (D50) of the longitudinal sides of any fifty plate-like particles within a field of vision. Also, the "aspect ratio of the plate-like filler" means a mean value of a ratio of the length of the longitudinal side of the plate-like particle to a thickness thereof (longitudinal length/thickness), which may be obtained by observing a cross section of the first resin-based coating with the scanning electron microscope (SEM) and dividing the mean particle diameter obtained by the method described above by a 50% accumulated value (D50) of the thickness of any fifty plate-like particles within the field of vision.

The content of the plate-like filler 302 is preferably 1 vol % to 20 vol % with respect to the total volume of the first resin-based coating 300. When the content of the plate-like filler 302 is within this range, the projections on the surface of the ring groove may be removed in a short time without severely roughening the surface of the ring groove. Also, since the plate-like filler 302 within the above range is resistant against the damaging force applied to the first resin-based coating 300 by the surface of the ring groove, the plate-like filler 302 may reduce attrition thereof. Further, an area exposing the plate-like filler 302 on the surface of the first resin-based coating 300 is optimized, improving the effect of alleviating the stress from the surface of the ring groove. Therefore, the first resin-based coating 300 may be stably sustained for a longer period of time, maintaining the excellent effect of preventing the aluminum cohesion. However, when the content of the plate-like filler 302 exceeds 20 vol %, the plate-like filler 302 possibly roughen the surface of the ring groove. On the other hand, when the content of the plate-like filler 302 is less than 1 vol %, the projections on the surface of the ring groove may not be removed in a short time.

The plate-like filler 302 is simply required to have the mean particle diameter and the aspect ratio as described above and to be harder than the resin forming the first resin-based coating 300. The plate-like filler 302 may be made of alumina, silicon carbide, silicon nitride, boron nitride, or the like. The plate-like filler may be produced by employing a known manufacturing method or may be a commercially available product. Plate-like alumina may be synthetic plate-like alumina (SERATH) produced by Kinsei Matec Co., Ltd., alumina filler (Serasur) produced by Corporation Kawai Lime Industry Co., Ltd., or the like. The plate-like filler 302 may be made of one or more materials.

The hard particles 202 contained in the second resin-based coating 200 have a mean particle diameter of 0.01 μm to 1 μm. Having the mean particle diameter within this range, the hard particles 202, which are fine particles, may further smoothen the surface of the ring groove when the second resin-based coating 200 is exposed after the first resin-based coating 300 is worn away. Therefore, attrition of the second resin-based coating 200 and, further, the aluminum cohesion caused by the direct contact between the surface of the ring groove and the piston ring body 100 may be suppressed. When the mean particle diameter of the hard particles 202 exceeds 1 μm, the hard particles 202 roughen the surface of the ring groove. On the other hand, when the mean particle diameter of the hard particles 202 is smaller than 0.01 μm, it is difficult for the hard particles 202 to smoothen the surface of the ring groove. Note that the hard particles 202 have no anisotropy; that is, an aspect ratio thereof is approximately 1 (1 to 1.5).

Note that the "mean particle diameter of the hard particles" as used herein may be obtained by observing a cross section of the second resin-based coating with the scanning electron microscope (SEM) and calculating a 50% accumulated value (D50) of the particle diameters of any fifty hard particles within the field of view. Or, the "mean particle diameter of the hard particles" may be a D50 obtained by, before formation of the second resin-based coating 200, measuring the hard particles in a powder state with a laser diffraction scattering type particle size distribution meter. Values obtained by these methods approximate each other.

The content of the hard particles 202 is preferably 1 vol % to 20 vol % with respect to the total volume of the second resin-based coating 200. Having the mean particle diameter within this range, the hard particles 202, before the second resin-based coating 200 is worn away, may further smoothen the surface of the ring groove than that when the first resin-based coating 300 is worn away, and suppress the aluminum cohesion at the time of the direct contact between the surface of the ring groove and the piston ring body 100. When the content of the hard particles 202 exceeds 20 vol %, the hard particles 202 possibly roughen the surface of the ring groove. On the other hand, when the content of the hard particles 202 is less than 1 vol %, the hard particles 202 are unable to smoothen the surface of the ring groove in a short time.

The hard particles 202 are made of a material harder than the material forming the piston ring body 100. In particular, the hard particles 202 may be made of alumina, zirconia, silicon carbide, silicon nitride, boron nitride, diamond, cerium oxide, or the like. Among them, alumina, silicon carbide, diamond, and cerium oxide, those having been successfully used as abrasive grains, are preferable. The hard particles 202 may be made of one or more materials.

The material of the first resin-based coating 300 and the second resin-based coating 200 is preferably a heat-resistant polymer having an aromatic ring or an aromatic heterocyclic ring in a main chain and, when temperature in the vicinity of the ring groove reaches 190° C. or higher, is preferably a non-crystalline polymer having glass transition temperature at 190° C. or higher or a crystalline polymer and a liquid crystalline polymer those having a melting point at 190° C. or higher. In particular, the material of these coatings may be polyimide, polyamide imide, polybenzimidazole, phenol, or the like and may be a mixture or a composite of two or more of these polymers.

Further, an organic-inorganic hybrid resin in which an inorganic substance such as silica or the like are dispersed at a molecular level may further improve the adhesion to the piston ring body 100. Although the first resin-based coating 300 and the second resin-based coating 200 may be made of the same resin material, in view of functions of the first resin-based coating 300 and the second resin-based coating 200, the first resin-based coating 300 is preferably made of polyimide that has high heat resistance and a low friction coefficient. On the other hand, the second resin-based coating 200 is preferably made of polyamide imide that has high heat resistance and excellent adhesion. As commercially available polyimide (PI), for example, U-Varnish A and U-Varnish S (produced by Ube Industries, Ltd.), H801D and H850D (produced by Arakawa Chemical Industries, Ltd.), RC5057, RC5097, and RC5019 (produced by I.S.T Corporation), and the like may be mentioned. As commercially available polyamide imide (PAI), HPC Series (produced by Hitachi Chemical Co., Ltd.), VYLOMAX (produced by Toyobo Co., Ltd.), and the like may be mentioned. Each of the first resin-based coating 300 and the second resin-based coating 200 contains the resin material as the main component; i.e., the resin material over 50 vol % with respect to respective entire resin-based coatings.

A total thickness of the first resin-based coating 300 and the second resin-based coating 200 is preferably 5 μm to 20 μm, and a thickness of the second resin-based coating 200 is preferably 1 μm to 3 μm. When second resin-based coating 200 has the thickness of less than 1 μm and, due to manufacturing variation at the time of application, includes a local area containing a great amount of the hard particles 202 or a local area with a less thickness, those local areas tend to cause separation. On the other hand, when the thickness of the second resin-based coating 200 exceeds 3 μm, the internal stress generated during curing of the second resin-based coating is likely to cause separation between the second resin-based coating 200 and the piston body 100. When the total thickness exceeds 20 μm, there is a problem in attaching the piston ring on the ring groove. On the other hand, when the total thickness is less than 5 μm, the entire coating is highly likely to become worn away. Note that, when the surface 500 has the plateau structure as illustrated in FIG. 3, the thickness of the second resin-based coating is measured from the plateau portions. Also, the "thickness of the resin-based coating" as used herein is obtained by observing a cross section of the resin-based coating with the scanning electron microscope (SEM) and calculating an arithmetic mean of thicknesses at any 10 points of the cross section.

Our piston ring is obtained by applying the first resin-based coating 300 and the second resin-based coating 200 to at least one of the upper surface and the lower surface of the piston ring. Especially, the piston ring having these coatings applied to the lower surface exhibits the excellent effect of preventing the aluminum cohesion.

[4] Method of Forming Resin-Based Coating

A method of forming the first resin-based coating 300 and the second resin-based coating 200 is not particularly limited but may employ a known method such as spray coating, printing, spin coating, roll coating, dip coating, or the like. From the viewpoint of formation efficiency of the first resin-based coating 300 and the second resin-based coating 200 and also from the viewpoint of suppression of coating unevenness, the printing method is preferable.

Although a method to adjust a coating liquid and an ink that are used to form the first resin-based coating 300 and the second resin-based coating 200 is not particularly limited, it is preferable to use a liquid obtained by mixing a commercially available varnish such as polyimide containing the plate-like filler 302 dispersed therein and a commercially available varnish such as polyamide imide containing the hard particles 202 dispersed therein while adding a solvent as necessary so as to obtain optimum viscosity. The solvent and additive used for the adjustment of the viscosity of the coating liquid and the ink are appropriately selected based on a coating method or a printing method. A method of dispersing the plate-like filler 302 and the hard particles 202 is not particularly limited but may employ a known method such as a sand mill, a bead mill, a ball mill, a roll mill, and the like. Also, a dispersant may be appropriately added as necessary. After application of the coating liquid and the ink to the piston ring body 100, or after printing thereof, the piston ring is dried in a curing process of the first resin-based coating 300 and the second resin-based coating 200. Curing temperature is determined based on the resin material being used.

The method of forming the resin-based coating may be applying the second resin-based coating 200 to the piston ring body 100, followed by applying (printing) the first resin-based coating 300 and, simultaneously, carrying out drying and curing process of the resin-based coating. When the second resin-based coating 200 and the first resin-based coating 300 become mixed on the piston ring body 100 at the time of the application of the first resin-based coating 300, the second resin-based coating 200 alone may be applied and subjected to the drying and curing process. Then, the first resin-based coating 300 is applied to the second resin-based coating 200, which has been cured, and subjected to the drying and curing process. Also, at the time of the application of the first resin-based coating 300, even after the drying and curing process of the second resin-based coating 200 that is preliminarily formed on the piston ring body 100, when the second resin-based coating 200 becomes eluted and mixed with the first resin-based coating 300 due to the solvent of the first resin-based coating 300, a layer made of a material which does not dissolve in the solvent of the first resin-based coating 300 may be provided on the second resin-based coating 200 prior to the application of the first resin-based coating 300.

Also, the surface 500 or a surface of the phosphate coating is grinded and thus provided with the plateau structure. Thereby, when the first resin-based coating 300 and the second resin-based coating 200, due to prolonged use thereof, are worn away exposing the piston ring body 100, unevenness of the surface 500 or the surface of the phosphate coating of the piston ring body 100 may prevent the abrasion of the piston.

A method of the grinding may employ belt grinding, surface grinding, or the like that are commonly employed. Also, varying a whetstone material, applied pressure, and the like may control sizes of the valley portions and the plateau portions.

In the plateau structure, further, a mean width of the valley portions 504 is preferably approximately the same as the mean particle diameter of the hard particles 202 in the second resin-based coating 200, i.e., 0.01 µm to 1 µm. Thereby, when the hard particles 202 in the second resin-based coating 200 are inserted into the valley portions 504 of the plateau structure, the hard particles 202 are fit in the valley portions 504 and, simultaneously, some of the hard particles 202 protrude from the surface 500 of the plateau structure, allowing withstanding against shear stress applied between the second resin-based coating 200 and the piston ring body 100, i.e., a force of the second resin-based coating 200 moving in a direction parallel to the upper surface and the lower surface of the piston ring with respect to the piston ring body 100. Also, a mean width of the plateau portions 506 is preferably 3 µm to 15 µm.

EXAMPLES

Our piston ring will be described in more detail in the following examples. However, our piston ring is not limited thereto.

Example 1

A piston ring made of low-chromium steel as the piston ring body was subjected to the grinding at the upper surface and the lower surface thereof, and the plateau structure on these surfaces were thus provided. An outer peripheral surface of the piston ring was subjected to ion-plating, whereby a CrN coating having a thickness of approximately 30 µm was formed. The piston ring thus obtained was subjected to alkaline degreasing and then immersed in a manganese phosphate aqueous solution heated to approximately 80° C. for 5 minutes, whereby a manganese phosphate coating having a thickness of approximately 2 µm was formed on the surface of the piston ring other than the outer peripheral surface thereof. A cross-section of the manganese phosphate coating was observed with the SEM, which showed that the plateau structure was reproduced having the valley portions with a mean width of 0.01 µm and the plateau portions with a mean width of 8 µm within the field of view.

To polyimide varnish (RC5057 produced by I.S.T Corporation), alumina powder serving as the plate-like filler having a mean particle diameter of 10 µm and the aspect ratio of 100 was added in an amount of 10 vol % with respect to the total volume of the first resin-based coating after being cured. A mixture thus obtained was sufficiently stirred by a stirrer and introduced in a three-roll mill having minimized roll intervals, whereby a coating liquid serving as the first resin-based coating was prepared. Also, to polyamide imide varnish (HR-13NX produced by Toyobo Co., Ltd.), alumina powder serving as the hard particles having a mean particle diameter of 0.5 µm and having no anisotropy was added in an amount of 10 vol % with respect to the total volume of the second resin-based coating after being cured. A mixture thus obtained was sufficiently stirred by the stirrer and introduced in the three-roll mill having minimized roll intervals, whereby a coating liquid serving as the second resin-based coating was prepared.

On the manganese phosphate coating on the upper surface and the lower surface of the piston ring body, the coating liquid serving as the second resin-based coating was sprayed and dried at 100° C. for 5 minutes. Next, the coating liquid serving as the first resin-based coating was sprayed on the second resin-based coating and dried at 100° C. for 5 minutes. Further, the first resin-based coating and the second resin-based coating are together cured in an electric furnace at 300° C. for 1 hour. A total thickness of the first resin-based coating and the second resin-based coating (on each surface) in the present example was 10 µm.

Example 2

In a manner similar to Example 1 other than changing the resin of the first resin-based coating from polyimide to polyamide imide, the plate-like filler from the alumina powder to silicon carbide powder, the resin of the first resin-based coating from polyamide imide to polyimide, and the hard particles from the alumina powder to zirconia powder, the first resin-based coating and the second resin-based coating were formed on the manganese phosphate coating on the upper surface and the lower surface of the piston ring body.

Example 3

In a manner similar to Example 1 other than changing the particle diameter of the alumina powder in the first resin-based coating to 1 µm, 2 µm, 20 µm, and 30 µm, the first resin-based coating and the second resin-based coating were formed on the manganese phosphate coating on the upper surface and the lower surface of the piston ring body.

Example 4

In a manner similar to Example 1 other than changing the aspect ratio of the alumina powder in the first resin-based coating to 10, 20, 200, and 300, the first resin-based coating and the second resin-based coating were formed on the manganese phosphate coating on the upper surface and the lower surface of the piston ring body.

Example 5

In a manner similar to Example 1 other than changing the content of the alumina powder in the first resin-based coating to 0.5 vol %, 1 vol %, 20 vol %, and 30 vol %, the first resin-based coating and the second resin-based coating were formed on the manganese phosphate coating on the upper surface and the lower surface of the piston ring body.

Example 6

In a manner similar to Example 1 other than changing the particle diameter of the alumina powder in the second resin-based coating to 0.008 µm, 0.01 µm, 0.1 µm, 1 µm, and 3 µm, the first resin-based coating and the second resin-based coating were formed on the manganese phosphate coating on the upper surface and the lower surface of the piston ring body.

Example 7

In a manner similar to Example 1 other than changing the content of the alumina powder in the second resin-based coating to 0.5 vol %, 1 vol %, 20 vol %, and 30 vol %, the first resin-based coating and the second resin-based coating were formed on the manganese phosphate coating on the upper surface and the lower surface of the piston ring body.

Example 8

The first resin-based coating was omitted, and a coating liquid was prepared by changing alumina in the second resin-based coating of Example 1 to a solid lubricant. Then, in a manner similar to Example 1, the second resin-based coating was formed on the manganese phosphate coating on the upper surface and the lower surface of the piston ring body. As the solid lubricant, molybdenum disulfide powder (having a mean particle diameter of 2 μm) in an amount of 5 vol % and graphite powder (having a mean particle diameter of 2 μm) in an amount of 5 vol % were added.

Example 9

The first resin-based coating was omitted, and alumina powder (having a particle diameter of 0.5 μm) in an amount of 5 vol % with respect to the second resin-based coating after being cured was added to the second resin-based coating of Example 8. Then, in a manner similar to Example 1, the second resin-based coating was formed on the manganese phosphate coating on the upper surface and the lower surface of the piston ring body.

Example 10

The alumina powder serving as the plate-like filler in the first resin-based coating was changed to plate-like copper powder which was added in an amount of 10 vol % to 60 vol % with respect to the first resin-based coating after being cured. The resin of the second resin-based coating was changed from polyamide imide to polyimide, and the alumina powder of the hard particles was also changed to soft plate-like copper powder (having a mean particle diameter of 10 μm and an aspect ratio of 100) which was added in an amount of 10 vol % to 20 vol % with respect to the second resin-based coating after being cured. In a manner similar to Example 1 other than the above changes, the first resin-based coating and the second resin-based coating were formed on the manganese phosphate coating on the upper surface and the lower surface of the piston ring body. Note that copper is softer than the low-chromium steel forming the piston ring body.

Example 11

In a manner similar to Example 1 other than changing the alumina powder in the second resin-based coating to plate-like alumina powder (having a mean particle diameter of 1 μm and an aspect ratio of 2), the first resin-based coating and the second resin-based coating were formed on the manganese phosphate coating on the upper surface and the lower surface of the piston ring body.

Example 12

In a manner similar to Example 1 other than changing the plate-like alumina powder in the first resin-based coating to alumina powder having a mean particle diameter of 0.5 μm and having no anisotropy, the first resin-based coating and the second resin-based coating were formed on the manganese phosphate coating on the upper surface and the lower surface of the piston ring body.

Example 13

In a manner similar to Example 1 other than omitting the addition of the alumina powder to the second resin-based coating, the first resin-based coating and the second resin-based coating were formed on the manganese phosphate coating on the upper surface and the lower surface of the piston ring body. This example corresponds to an example illustrated in FIG. 4.

Example 14

In a manner similar to Example 1 other than omitting the formation of the second resin-based coating, the first resin-based coating was formed on the manganese phosphate coating on the upper surface and the lower surface of the piston ring body. This example corresponds to an example illustrated in FIG. 6.

<Evaluation of Properties>

Figure 7:
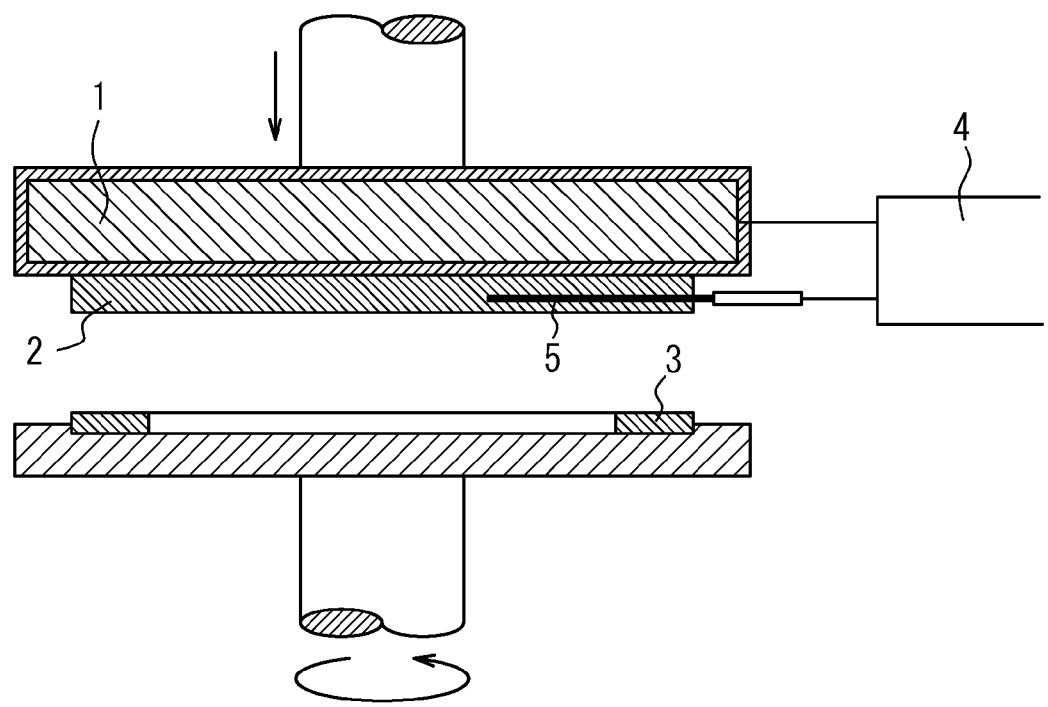
FIG. 7 is a cross-sectional diagram illustrating an outline of a single adhesion tester.

The piston ring of each Example was tested with a single cohesion testing machine that correlates with an engine. The single cohesion testing machine has a structure in which, as illustrated in FIG. 7, a piston 2 vertically reciprocates and a piston ring 3 performs a rotational movement. In the test, the piston 2 was under heating control by a heater 1 and a thermocouple 5. A test condition includes a surface pressure at 5.0 MPa, a rotation speed at 3.0 mm/s, controlled temperature at 250° C., a test period for 3 hours, and addition of oil whenever necessary.

Results of a single cohesion test are shown in Table 1. Determination criteria of Table 1 are as follows: the surface roughness was compared based on a level difference Rk of a core portion, and the Rk of the surface of the piston material prior to the test was approximately 1.0 μm.

(1) Thickness of Remaining Resin-Based Coating after the Test
Excellent: 3 μm or more
Good: 1 μm or more and less than 3 μm
Fair: less than 1 μm (with the manganese phosphate coating)
Poor: less than 1 μm (without the manganese phosphate coating)

(2) Cohesion
Good: no cohesion
Fair: cohesion (confirmed using a step meter or the like)
Poor: cohesion (roughness (cohesion) was observed with naked eyes)

(3) Wearing State of Ring Groove
Excellent: less than 0.5 μm
Good: 0.5 μm or more and less than 1.0 μm
Fair: 1.0 μm or more and less than 1.5 μm
Poor: 1.5 μm or more (4) Surface Roughness (Rk)
Excellent: less than 0.3 μm
Good: 0.3 μm or more and less than 0.5 μm
Fair: 0.5 μm or more and less than 0.7 μm
Poor: 0.7 μm or more

TABLE 1

| | | First resin-based coating | | | | | Second resin-based coating | | | | | Total of resin-based coatings Coating thickness (μm) | Piston ring | | Piston groove | |
|---|---|---|---|---|---|---|---|---|---|---|---|---|---|---|---|---|
| Classification | Resin | Plate-like filler | Particle diameter (μm) | Aspect ratio | Content (vol %) | Resin | Hard particles | Particle diameter (μm) | Content (vol %) | Coating thickness (μm) | | Remaining coating | Cohesion | Abrasion of groove | Surface roughness |
| Example 1 | Our example | PI | Al₂O₃ | 10 | 100 | 10 | PAI | Al₂O₃ | 0.5 | 10 | 2 | 10 | Excellent | Good | Excellent | Excellent |
| Example 2 | Our example | PAI | SiC | 10 | 100 | 10 | PI | ZrO₂ | 0.5 | 10 | 2 | 10 | Excellent | Good | Excellent | Excellent |
| Example 3 | Comparative example | PI | Al₂O₃ | 1 | 100 | 10 | PAI | Al₂O₃ | 0.5 | 10 | 2 | 10 | Fair | Good | Good | Good |
| Example 4 | Our example | PI | Al₂O₃ | 2 | 100 | 10 | PAI | Al₂O₃ | 0.5 | 10 | 2 | 10 | Excellent | Good | Excellent | Excellent |
| | Our example | PI | Al₂O₃ | 20 | 100 | 10 | PAI | Al₂O₃ | 0.5 | 10 | 2 | 10 | Excellent | Good | Excellent | Excellent |
| | Comparative example | PI | Al₂O₃ | 30 | 100 | 10 | PAI | Al₂O₃ | 0.5 | 10 | 2 | 10 | Fair | Good | Fair | Fair |
| Example 5 | Comparative example | PI | Al₂O₃ | 10 | 10 | 10 | PAI | Al₂O₃ | 0.5 | 10 | 2 | 10 | Fair | Good | Good | Good |
| | Our example | PI | Al₂O₃ | 10 | 20 | 10 | PAI | Al₂O₃ | 0.5 | 10 | 2 | 10 | Excellent | Good | Excellent | Excellent |
| | Our example | PI | Al₂O₃ | 10 | 200 | 10 | PAI | Al₂O₃ | 0.5 | 10 | 2 | 10 | Excellent | Good | Excellent | Excellent |
| | Comparative example | PI | Al₂O₃ | 10 | 300 | 10 | PAI | Al₂O₃ | 0.5 | 10 | 2 | 10 | Excellent | Good | Fair | Fair |
| Example 6 | Comparative example | PI | Al₂O₃ | 10 | 100 | 0.5 | PAI | Al₂O₃ | 0.5 | 10 | 2 | 10 | Good | Good | Excellent | Excellent |
| | Our example | PI | Al₂O₃ | 10 | 100 | 1 | PAI | Al₂O₃ | 0.5 | 10 | 2 | 10 | Excellent | Good | Excellent | Excellent |
| | Our example | PI | Al₂O₃ | 10 | 100 | 20 | PAI | Al₂O₃ | 0.5 | 10 | 2 | 10 | Excellent | Good | Excellent | Excellent |
| | Comparative example | PI | Al₂O₃ | 10 | 100 | 30 | PAI | Al₂O₃ | 0.5 | 10 | 2 | 10 | Good | Good | Good | Good |
| | Comparative example | PI | Al₂O₃ | 10 | 100 | 10 | PAI | Al₂O₃ | 0.008 | 10 | 2 | 10 | Fair | Good | Fair | Fair |
| Example 7 | Our example | PI | Al₂O₃ | 10 | 100 | 10 | PAI | Al₂O₃ | 0.01 | 10 | 2 | 10 | Excellent | Good | Excellent | Excellent |
| | Our example | PI | Al₂O₃ | 10 | 100 | 10 | PAI | Al₂O₃ | 0.1 | 10 | 2 | 10 | Excellent | Good | Excellent | Excellent |
| | Our example | PI | Al₂O₃ | 10 | 100 | 10 | PAI | Al₂O₃ | 1 | 10 | 2 | 10 | Excellent | Good | Excellent | Excellent |
| | Comparative example | PI | Al₂O₃ | 10 | 100 | 10 | PAI | Al₂O₃ | 3 | 10 | 2 | 10 | Fair | Good | Fair | Fair |
| Example 8 | Our example | PI | Al₂O₃ | 10 | 100 | 10 | PAI | Al₂O₃ | 0.5 | 0.5 | 2 | 10 | Good | Good | Good | Good |
| | Our example | PI | Al₂O₃ | 10 | 100 | 10 | PAI | Al₂O₃ | 0.5 | 1 | 2 | 10 | Excellent | Good | Excellent | Excellent |
| | Our example | PI | Al₂O₃ | 10 | 100 | 10 | PAI | Al₂O₃ | 0.5 | 20 | 2 | 10 | Excellent | Good | Excellent | Excellent |
| | Our example | PI | Al₂O₃ | 10 | 100 | 10 | PAI | Al₂O₃ | 0.5 | 30 | 2 | 10 | Good | Good | Good | Good |
| Example 9 | Comparative example | PI | Al₂O₃ | 10 | 100 | 10 | PAI | * | * | * | 10 | 10 | Poor | Poor | Poor | Poor |
| Example 10 | Comparative example | PI | Cu | 10 | 100 | 60 | PAI | ** | ** | ** | 10 | 10 | Poor | Poor | Poor | Poor |
| Example 11 | Comparative example | PI | Al₂O₃ | 10 | 100 | 10 | PI | Plate-like Cu | 10 | 20 | 2 | 10 | Fair | Fair | Fair | Fair |
| Example 12 | Comparative example | PI | *** | 0.5 | 1 | 10 | PAI | Plate-like Al₂O₃ | 1 | 10 | 2 | 10 | Fair | Fair | Good | Good |
| Example 13 | Comparative example | PI | Al₂O₃ | 10 | 100 | 10 | PAI | Al₂O₃ | 0.5 | 10 | 2 | 10 | Fair | Fair | Fair | Fair |
| | Comparative example | PI | Al₂O₃ | 10 | 100 | 10 | PAI | — | — | — | 2 | 10 | Fair | Fair | Fair | Fair |

TABLE 1-continued

| | | First resin-based coating | | | | | | Second resin-based coating | | | | Total of resin-based coatings Coating thickness (μm) | Piston ring | | Piston groove | |
|---|---|---|---|---|---|---|---|---|---|---|---|---|---|---|---|---|
| Classification | Resin | Plate-like filler | Particle diameter (μm) | Aspect ratio | Content (vol %) | Resin | Hard particles | Particle diameter (μm) | Content (vol %) | Coating thickness (μm) | | | Remaining coating | Cohesion | Abrasion of groove | Surface roughness |
| Example 14 Comparative example | PI | Al₂O₃ | 10 | 100 | 10 | — | — | — | — | — | | 10 | Fair | Fair | Good | Good |

PI Polyimide
PAI Polyamide imide
* Molybdenum disulfide (mean particle diameter 2 μm, 5 vol %), graphite (mean particle diameter 2 μm, 5 vol %)
** Molybdenum disulfide (mean particle diameter 2 μm, 5 vol %), graphite (mean particle diameter 2 μm, 5 vol %), alumina (mean particle diameter 0.5 μm, 5 vol %)
*** Al₂O₃ (particle diameter 0.5 μm, aspect ratio 1)

<Result of Evaluation>

In Example 8 and Example 9 serving as comparative examples, after the single cohesion test, there was no remaining resin-based coating at all. Also, the abrasion was observed on the manganese phosphate coating serving as a base of the piston ring body, showing significant aluminum cohesion. It was further observed that the surface of the piston 2 was not smoothened but the abrasion thereof was in progress.

In Example (Comparative Example) 10 where the soft plate-like copper powder was dispersed in polyimide and the first resin-based coating and the second resin-based coating containing the soft plate-like copper powder in each amount were applied, after the single cohesion test, slight aluminum cohesion was observed. It was also observed that the resin-based coating of the piston ring hardly remained and that abrasion of the ring groove was in progress while the surface of the ring groove was not smoothened.

On the other hand, the aluminum cohesion was observed in neither Example 1 nor Example 2, in which the resin-based coating and the ring groove were slightly worn away while the surface of the ring groove was smoothened.

In Example 3 where the mean particle diameter of the alumina powder serving as the plate-like filler in the first resin-based coating was changed, the resin-based coating containing the alumina powder having the mean particle diameter of 2 μm to 20 μm exhibited excellent abrasion resistance. In Example 4 where the aspect ratio of the alumina powder serving as the plate-like filler in the first resin-based coating was changed, the resin-based coating containing the alumina powder having the aspect ratio of 20 to 200 exhibited an excellent smoothing effect of the surface of the ring groove. In Example 5 where the content of the alumina powder serving as the plate-like filler was changed, the resin-based coating containing the alumina powder in an amount of 1 vol % to 20 vol % exhibited particularly excellent abrasion resistance.

In Example 6 where the mean particle diameter of the alumina powder serving as the hard particles in the second resin-based coating was changed, the resin-based coating containing the alumina powder having the particle diameter of 0.01 μm to 1 μm exhibited excellent abrasion resistance and surface of the ring groove. In Example 7 where the content of the alumina powder serving as the hard particles in the second resin-based coating was changed, the resin-based coating containing the alumina powder in an amount of 1 vol % to 20 vol % exhibited particularly excellent abrasion resistance and surface of the ring groove.

In Example 13, on the other hand, it was confirmed that the abrasion of the ring groove and the attrition of the resin-based coating were caused in a shorter time than our examples. In Example 14, also, the coating was eventually worn away along with separation thereof.

It was also confirmed that, as compared with Example (Comparative Example) 11 where the plate-like alumina were added to both the first resin-based coating and the second resin-based coating, our example has excellent coating adhesion and may maintain the coating for a longer period of time preventing the aluminum cohesion. It was further confirmed that, as compared with Example (Comparative Example) 12 using the alumina powder having the mean particle diameter of 0.5 μm and having no anisotropy, our example may maintain the coating for a longer period of time preventing the aluminum cohesion.

From the results described above, it was confirmed that our piston ring is capable of sustaining the excellent effect of preventing the aluminum cohesion over a prolonged period of time.

INDUSTRIAL APPLICABILITY

This disclosure may provide the piston ring that sustains the effect of preventing the aluminum cohesion under high temperature conditions over a prolonged period of time.

REFERENCE SIGNS LIST 1 heater
2 piston
3 piston ring
4 temperature controller
5 thermocouple
100 piston ring body
200 second resin-based coating
202 hard particles
300 first resin-based coating
302 plate-like filler
500 surface of piston ring body
502 valley portion
504 peak portion
506 plateau portion

The invention claimed is:

1. A piston ring having a resin-based coating formed on at least one of an upper surface and a lower surface of a piston ring body, wherein
the resin-based coating comprises a first resin-based coating containing a plate-like filler having a mean particle diameter of 2 μm to 20 μm and an aspect ratio of 20 to 200, and a second resin-based coating located closer to the piston ring body than the first resin-based coating and containing hard particles having a mean particle diameter of 0.01 μm to 1 μm,
a surface immediately under the second resin-based coating has a plateau structure having plateau portions and valley portions,
a mean width of the valley portions is approximately the same as the mean particle diameter of the hard particles in the second resin-based coating, and
some of the hard particles are inserted in the valley portions of the plateau structure and protrude from the surface of the plateau portions.

2. The piston ring according to claim 1, wherein
the content of the plate-like filler is 1 vol % to 20 vol % with respect to the total volume of the first resin-based coating.

3. The piston ring according to claim 1, wherein
the content of the hard particles is 1 vol % to 20 vol % with respect to the total volume of the second resin-based coating.

4. The piston ring according to claim 1, wherein
the plate-like filler comprises at least one selected from a group consisting of alumina, silicon carbide, silicon nitride, and boron nitride.

5. The piston ring according to claim 1, wherein
the hard particles are made of at least one selected from a group consisting of alumina, zirconia, silicon carbide, silicon nitride, boron nitride, diamond, and cerium oxide.

6. The piston ring according to claim 1, wherein
a thickness of the resin-based coating is 5 μm to 20 μm, and a thickness of the second resin-based coating is 1 μm to 3 μm.

7. The piston ring according to claim 1, wherein
the resin-based coating includes, as a main component, at least one selected from a group consisting of a polyimide resin, a polyamide imide resin, a polybenzimidazole resin, and a phenol resin.

8. The piston ring according to claim 1, wherein
a phosphate coating is provided between at least one of the upper surface and the lower surface of the piston ring body and the resin-based coating.

* * * * *